Patented June 23, 1936

2,044,772

UNITED STATES PATENT OFFICE

2,044,772

PRESERVATIVE AND MARINE GROWTH ARRESTING PROCESS

Wallace T. Conn, Lawrence, Mass., assignor to the Government of the United States, represented by the Secretary of Commerce No Drawing. Application October 29, 1932, Serial No. 640,352

1 Claim. (Cl. 91—68)

(Granted under the act of March 3, 1883, as amended April 30, 1928; 370 O. G. 757)

The invention described herein may be manufactured and used by or for the Government of the United States for governmental purposes only, without the payment of any royalty thereon.

My invention relates to a process for the preservation of articles made of cellulose or fibrous materials and also for arresting marine growths by the use of an organic compound of mercury.

It is well known that fish nets and marine cordage when exposed in natural bodies of water for considerable periods of time are subject to deterioration which results in a loss of tensile strength. It is obvious that any accumulations of vegetable growths or of barnacle-like forms of shell-fish which tend to close the meshes of the fish net offer increased resistance to the flow of water through the net. The stresses due to this increased resistance may be sufficient to result in the tearing loose of the net from its anchorage.

Marine growths attached to nets which are suspended from stakes or buoys, also produce extra stresses due to gravity and result in extraordinary strain and labor when a net has to be handled. Small barnacles and other shell fish having sharp edges, when attached to nets result in injury to the hands of fishermen. In certain fishing waters fixed heavy nets have to be brought ashore at frequent intervals for cleaning; this results in considerable cost and inconvenience. It is obvious that any method or chemical process that materially reduces marine growths and at the same time does not produce undesirable effects, is of commercial value, as is disclosed by my predecessor Mr. Harden F. Taylor, in a publication entitled "Department of Commerce, Bureau of Fisheries Document No. 898". My invention disclosed herein is a result of the continuation of the study of preservative process since Mr. Taylor's correlation of prior known process.

My invention provides a preservative chemical treatment for fibrous material including fish nets, marine cordage and the like as well as providing an antifouling coating for surfaces normally immersed in natural bodies of water for considerable periods of time. It has been shown by actual tests to increase the resistance to the destructive growths and forces to which such nets are subjected when in use as well as materially reducing the accumulations of marine growths on nets as well as upon surfaces upon which the accumulations of marine growths are objectionable.

It has been found that inorganic compounds of mercury, for example mercuric oxide, produce results of limited and uncertain values as net preservatives.

I have discovered that when an organic compound of mercury containing an ethyl radical, such as ethyl mercury chloride, is mixed with or dissolved in a suitable carrier, such as a tar-like substance, and applied to cordage or webbing, that the amount of depreciation in the tensile strength of fish nets immersed in natural bodies of water is materially decreased; that the rate of this depreciation is reduced; and that the accumulations of marine growths upon the nets are greatly reduced. Thus the useful life of such nets is materially increased by lessening the maximum stresses to which they may be subjected as well as prolonging the period during which the net retains sufficient strength to be serviceable.

In fish net twine to which this invention has been applied, it was found that a proportion of ethyl-mercury chloride equivalent in weight to 1/100% of the tar carrier was positively but not materially efficacious, but when the proportion of the mercury compound was raised to ½%, the effect in reducing marine growths was superior to anything hitherto known. Coincident with this anti-fouling property of the organic mercury compound, the tensile strength of the impregnated twine has a greater resistance to depreciation when exposed under adverse conditions, to a degree higher than has previously been found when natural cotton twine was impregnated with a mixture of tar and added chemical.

In the application of my preservative I have found that best results may be obtained by thoroughly mixing the organic compound with the tar, or similar carrier, and immersing the cellulose material in this mixture for a period of time sufficient in length to expel the air from the cellulose stock, which is approximately three minutes, at a temperature sufficiently high to bring about a thorough impregnation. A temperature of more than 180° Fahrenheit has been found to give best results. The material thus treated should preferably be allowed to dry at atmospheric temperature before use.

Marine growth and depreciation of fish nets, cordage and the like are subject to considerable variations due to location, month, year, and so forth. Hence the protective requirement varies accordingly and therefore I do not limit my invention to the percentage or proportion of ethyl mercury chloride above described as efficacious nor do I limit my invention to this particular chemical in combination, since the effects or benefits produced are due to mercury in organic combination, disseminated through or mixed with a carrier, with the mixture applied to or impregnated into cellulose fibres.

I have also discovered that the application of an organic compound of mercury, such as ethyl mercury chloride, mixed with or dissolved in ship-bottom, or "marine", paint materially reduces the fouling upon the submerged portion of the hull of a ship. Extensive experimentation with marine paints containing mercuric or other inorganic compounds of mercury for preventing marine growths upon the submerged portions of the hulls of vessels have failed to approximate the results which may be obtained with my invention.

My invention also provides a means for materially retarding the deterioration of canvas; tobacco cloth; cordage, twine; or the like from the effects of the weather, and particularly from the effects of repeated wetting and long exposure in the air while damp.

The foregoing description comprehends only a general and preferred embodiment of my invention and detail changes in the process, method and compositions may be made within the scope of my claim which is therefore intended as not restricted to the specific details of my invention as disclosed herein.

What I claim is:—

Cordage and the like composed of cellulose material containing ethyl mercury chloride in combination with a tar-like carrier.

WALLACE T. CONN.